United States Patent
Diev et al.

(10) Patent No.: US 8,131,615 B2
(45) Date of Patent: Mar. 6, 2012

(54) INCREMENTAL FACTORIZATION-BASED SMOOTHING OF SPARSE MULTI-DIMENSIONAL RISK TABLES

(75) Inventors: Vesselin Diev, San Diego, CA (US); Shailesh Kumar, San Diego, CA (US); Scott M. Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 696 days.

(21) Appl. No.: 12/163,688

(22) Filed: Jun. 27, 2008

(65) Prior Publication Data
US 2009/0327132 A1 Dec. 31, 2009

(51) Int. Cl.
G06Q 40/00 (2006.01)

(52) U.S. Cl. .......................... 705/35; 705/38

(58) Field of Classification Search ............ 705/35
See application file for complete search history.

(56) References Cited

U.S. PATENT DOCUMENTS

| | | | | |
|---|---|---|---|---|
| 6,895,383 B2* | 5/2005 | Heinrich | | 705/7.28 |
| 7,398,918 B1* | 7/2008 | Schwartz, Jr. | | 235/380 |
| 7,613,625 B2* | 11/2009 | Heinrich | | 705/7.28 |
| 7,797,232 B2* | 9/2010 | Kuroda et al. | | 705/38 |
| 7,835,974 B2* | 11/2010 | Burgis et al. | | 705/37 |
| 7,873,567 B2* | 1/2011 | Eder | | 705/38 |
| 7,908,197 B2* | 3/2011 | De Prisco et al. | | 705/36 R |
| 2004/0044585 A1* | 3/2004 | Franco | | 705/26 |
| 2004/0230514 A1* | 11/2004 | Burgis et al. | | 705/37 |
| 2005/0015283 A1* | 1/2005 | Iino et al. | | 705/4 |
| 2005/0071266 A1* | 3/2005 | Eder | | 705/38 |
| 2005/0114186 A1* | 5/2005 | Heinrich | | 705/7 |
| 2005/0246207 A1* | 11/2005 | Noonan et al. | | 705/4 |
| 2006/0217925 A1* | 9/2006 | Taron et al. | | 702/179 |
| 2008/0021801 A1* | 1/2008 | Song et al. | | 705/35 |
| 2008/0255898 A1* | 10/2008 | Kuroda et al. | | 705/7 |
| 2008/0275821 A1* | 11/2008 | Bishop et al. | | 705/64 |
| 2009/0030862 A1* | 1/2009 | King et al. | | 706/45 |
| 2009/0259523 A1* | 10/2009 | Rapperport et al. | | 705/10 |
| 2009/0292568 A1* | 11/2009 | Khosravani et al. | | 705/7 |
| 2010/0274708 A1* | 10/2010 | Allen | | 705/38 |

* cited by examiner

Primary Examiner — Kirsten Apple
(74) Attorney, Agent, or Firm — Mintz, Levin, Cohn, Ferris, Glovsky and Popeo, P.C.

(57) ABSTRACT

A system for classifying a transaction as fraudulent includes a training component and a scoring component. The training component acts on historical data and also includes a multi-dimensional risk table component comprising one or more multidimensional risk tables each of which approximates an initial risk value for a substantially empty cell in a risk table based upon risk values in cells related to the substantially empty cell. The scoring component produces a score, based in part, on the risk tables associated with groupings of variables having values determined by the training component. The scoring component includes a statistical model that produces an output and wherein the transaction is classified as fraudulent when the output is above a selected threshold value.

8 Claims, 5 Drawing Sheets

INCREMENTAL FACTORIZATION-BASED SMOOTHING OF SPARSE MULTI-DIMENSIONAL RISK TABLES

TECHNICAL FIELD

Various embodiments described herein relate to apparatus, systems, and methods associated with detecting fraud in various types of transactions. More specifically, the embodiments described herein detail a method and apparatus for incremental factorization-based smoothing of sparse multi-dimensional risk tables.

BACKGROUND

With the increase in communications and electronic transactions, incidents of fraud surrounding these activities has increased. For example, "cloning" a cellular telephone is a type of telecommunications fraud where an identifier, such as a serial number, for a cellular telephone is snooped, or read, as calls are transmitted, captured, and used to identify calls transmitted by other cellular telephones. When the other cellular telephones transmit calls, the calls may be fraudulently charged to the account holder for the original cellular telephone.

Another fraudulent activity includes stealing credit card numbers. Some workers carry small readers for reading the vital information from a credit card. A person may get a job as a waiter or cashier in a restaurant and when the customer provides his credit card, the credit card may be swiped as part of a payment and swiped again using the small reader. The credit information is captured and then the person misappropriating the credit card information will use the information to make unauthorized purchases, or sell the information related to the credit card to others who will place unauthorized purchases. There are other schemes where a group of bad actors set up bogus ATM machines. In one instance, a convenience store owner was given $100 to allow a bogus machine to be placed in the store. The ATM included a reader only so prospective customers would use the machine and then complain that it did not dispense money. The bad actor would pick up the machine after several days and take it for "repair" and would never return. The misappropriated credit card numbers would then be either sold or used to make various purchases.

In short, various fraudulent schemes result in large losses to various institutions. Generally, the losses are billions of dollars per year. Therefore, there is large demand for systems and methods to detect fraudulent transactions. Some current systems and methods attempt to detect fraudulent transactions by constructing a model based on historical observations or transactions. By observing a large number of transactions, characteristics of fraud may be derived from the data. These characteristics can be then be used to determine whether a particular transaction is likely to be fraudulent.

For example, characteristics of 100,000 transactions, such as phone calls or points of sale, can be captured and later characterized as fraudulent or legitimate. The fraudulent calls in the 100,000 calls may share similar characteristics and transaction patterns that are used to build static model that indicate the probability of fraud for incoming transactions. Similarly, the fraudulent credit card transactions in the 100,000 transactions may share a different set of similar characteristics and transaction patterns. The similar characteristics, in either case, are used to build a static model that indicates the probability of fraud for incoming transactions, such as transactions associated with phone calls, point of sale transactions, internet sales transactions, and the like. In certain systems, these static, historical models can be used in a production, or real-time, environment to evaluation a probability of fraud for incoming transactions. However, creation of the historical model may be difficult to deploy.

The models formed for production many times include an indication of fraudulent or non-fraudulent activity and also associate a risk with the assessment where value of fraud is 1.0 and non-fraud is 0.0. The risk will generally have a value between 0.0 and 1.0 and will, therefore, serve as a probability of whether there is an actual fraud. Thus, the decision to label a particular transaction as fraudulent will have an indication of the probability that the fraud determination is correct.

A risk table is used to assess risk to a particular group of variables from a transaction. Typically, methods use one dimensional (1-D) risk tables, which essentially represent a Naive Bayes method of assigning risk to the values of categorical variables. The interaction among raw categorical variables is not taken into account when a 1-D risk table is used. A two dimensional (2-D) risk table or multi-dimensional risk table would capture at least some of the interactions among various categorical variables. However, multi-dimensional risk tables generally are more limited primarily due to inherent issues around the sparseness of exemplars on which to estimate risk for the permutations of the various variable values. For example, using a typical 2-D risk table for associating two variables normally yields a risk table having many blank values for cells where the co-occurrences of variable values are not well represented or are non-existent in the training data.

Blank values are undesirable. Populating the blank values with a default value is often bad since the default value may overstate or understate the risk of fraud associated with the variables.

SUMMARY

In one aspect, risk associated with a multi-dimensional risk table can be assessed by approximating an initial risk value for a substantially empty cell in a risk table based upon risk values in cells related to the substantially empty cell. Thereafter, an adjustment value can be determined for the approximated initial risk value. The adjustment value can be applied to the initial risk value to yield a final approximate risk value for the previously substantially empty cell. The final approximate risk value can be used subsequently in a statistical model, the statistical model enabling a determination to be made whether transaction data is to be classified as fraudulent.

A risk value can be determined for the non-empty cells in the risk table. Approximating an initial risk value for a substantially empty cell in a risk table can include computing a weighted sum of the risk values of the non-empty cells in the row of the substantially empty cell in the risk table. Approximating an initial risk value for a substantially empty cell in a risk table can include computing a weighted sum of the risk values of the non-empty cells in the column of the substantially empty cell in the risk table. Approximating an initial risk value for a substantially empty cell in a risk table can include computing a weighted sum of the risk values of the non-empty cells in the row of the substantially empty cell in the risk table, computing a weighted sum of the risk values of the non-empty cells in the column of the substantially empty cell in the risk table, and determining the approximate initial risk value based on the weighted average of the risks of the row of risk values and the column of risk values that intersect at the substantially empty cell in the risk table.

Determining the adjustment value can include determining a first matrix associated with a first variable associated with the risk table, and determining a second matrix associated with a second variable associated with the risk table. The first matrix can be multiplied with the second matrix.

A first grouping of variables can be identified so that a risk table can be determined for such first grouping of variables and a second grouping of variables can be identified so that a risk table can be determined for such second grouping of variables. At least one of the first grouping of variables, and the second grouping of variables can include a pair of variables. A two-dimensional risk table can, in some implementations be built.

In an interrelated aspect, the probability that a transaction is fraudulent can be predicted by reading historical transaction data and introducing a set of variables including multi-dimensional risk table variables. These risk table variable values can include approximating an initial risk value for a substantially empty cell in a risk table based upon risk values in cells related to the substantially empty cell, determining an adjustment value for the approximated initial risk value, applying the adjustment value to the initial risk value to yield a final approximate risk value for the previously substantially empty cell, determining a set of classification criteria, reading substantially real time transaction data, computing variables for substantially real time transaction data, wherein some of the variables are determined by obtaining values from the multi-dimensional risk tables computed, applying the classification criteria to the substantially real time transaction data, scoring the substantially real time transaction data, and classifying the transaction data as fraudulent based on whether the score is above a predefined threshold.

Approximating an initial risk value for a substantially empty cell in a risk table can include computing a weighted sum of the risk values of the non-empty cells in the row of the substantially empty cell in the risk table. Approximating an initial risk value for a substantially empty cell in a risk table can include computing a weighted sum of the risk values of the non-empty cells in the column of the substantially empty cell in the risk table. Approximating an initial risk value for a substantially empty cell in a risk table can also include computing a weighted sum of the risk values of the non-empty cells in the row of the substantially empty cell in the risk table, computing a weighted sum of the risk values of the non-empty cells in the column of the substantially empty cells in the risk table, and determining the approximate initial risk value based on the weighted average of the risks of the row of risk values and the column of risk values that intersect at the substantially empty cell in the risk table. Determining the adjustment value can include determining a first matrix associated with a first variable associated with the risk table, and determining a second matrix associated with a second variable associated with the risk table. The first matrix can, in some variations, be multiplied by the second matrix.

A system for classifying a transaction as fraudulent can include a training component and a scoring component. The training component can act on historical data farther comprising a multi-dimensional risk table component that approximates an initial risk value for a substantially empty cell in a risk table for a grouping of 2 or more variables based upon risk values in cells related to the substantially empty cell. The scoring component can produce a score, based in part, on the risk tables associated with groupings of variables having values determined by the training component, wherein the scoring component includes a statistical model that produces an output and wherein the transaction is classified as fraudulent when the output is above a selected threshold value.

The system can also include an adjustment value determination module for adjusting the approximated initial risk value and applying the adjustment value to the initial risk value to yield a final approximate risk value for a previously substantially empty cell.

The multi-dimensional table can be at least a two-dimensional table that assesses the risk for different occurrences of two variables. The training module can employ a plurality of multi-dimensional risk tables.

In still a further interrelated aspect, transaction data can be read, an initial risk value for a substantially empty cell in a risk table based upon risk values in cells related to the substantially empty cell can be approximated, an adjustment value can be determined for the approximated initial risk value; and the adjustment value can be applied to the initial risk value to yield a final approximate risk value for the previously substantially empty cell.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
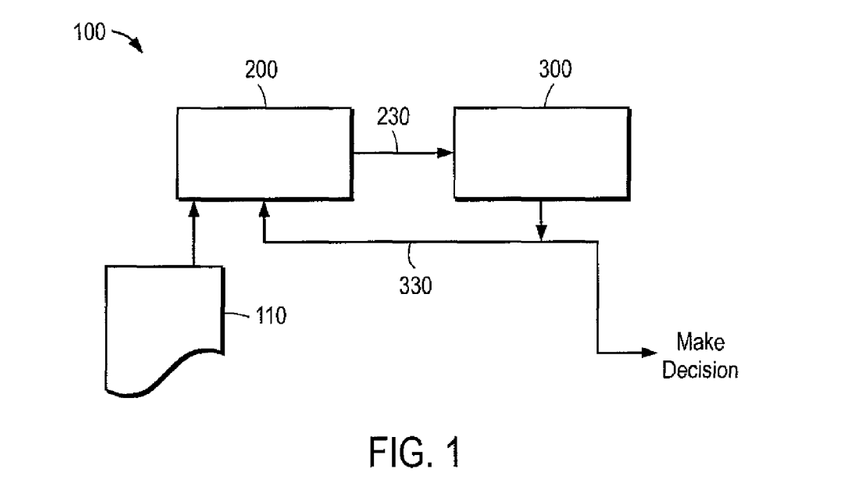
FIG. 1 is a schematic diagram of a fraud detection system.

FIG. 1 is a block diagram of an example fraud detection system 100. As shown in FIG. 1, the fraud detection system 100 includes a learning component 200 and a predictive/scoring component 300. The learning component 200 processes historical data 110 and recognizes various patterns. The learning component has an output 230. The output 230 from the learning component 200 is a model that can be used with live or substantially real time data to predict or detect a fraud. The output 230 of the learning component 200 is input to the predictive/scoring component 300 which categorizes the transaction as fraudulent and scores the likelihood that the transaction is fraudulent. This output 330 can then be used by an institution that can either approve or disapprove a transaction. The output 330 can also be fed back into the learning component 200 to be used by the learning component 200 to further refine the model and make the static model dynamic, represented by output 230 of the learning component 200.

Figure 2:
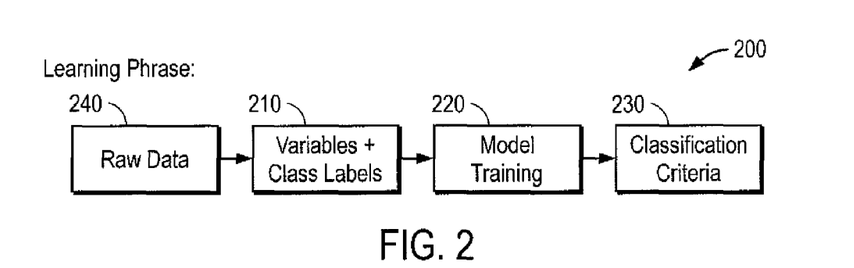
FIG. 2 is a schematic diagram of a learning component of the fraud detection system.

FIG. 2 is a schematic diagram of a learning component 200 of the fraud detection system 100, according to an example embodiment. The learning component 200 includes a variable extractor 210, a model trainer 220 and a classifier 230. The learning component 200 uses historical data as a raw data input 240. The historical data includes class labels. The process used by the learning component 200 includes taking raw data 240 and extracting variables (features) from the raw data 240 at the variable extractor 210. Pre-defined class labels are added to the extracted variables. A learning algorithm is used to detect patterns for classification. The detected patterns are used to build and train a model at the model trainer 220. The model is trained such that the various variables used will produce the proper classification at the classifier 230. In fraud detection, the transactions are classified as fraudulent or not fraudulent. When classifying new data instances, such as when a new transaction is occurring in real time or substantially real time, the classification criteria learned in the learning component 200 are used to make a prediction.

Figure 3:
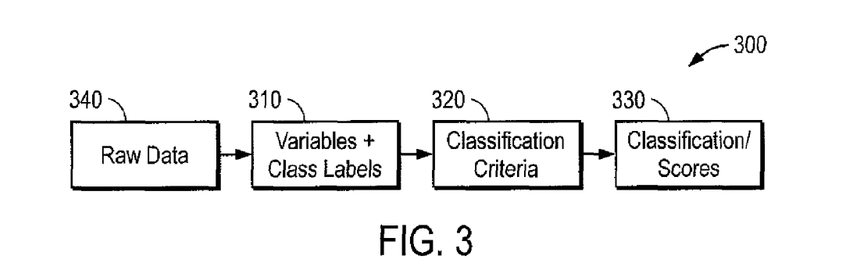
FIG. 3 is a schematic diagram of a predictive/scoring component of the fraud detection system.

FIG. 3 is a schematic diagram of a predictive/scoring component 300 of the fraud detection system 100, according to an example embodiment. The predictive/scoring component 300 includes a source of raw data 340. The raw data 340 are transactions that are occurring in real time or substantially real time. In other words, the transactions are occurring or have occurred shortly beforehand. The predictive/scoring component 300 also includes a variable extractor 310. The variables that were determined to be relevant in the learning module 200 (see FIG. 2) are extracted from the raw data 340. The predictive/scoring component 300 also includes a classification applicator 320. The classification applicator 320 applies the classification criteria learned in the learning component 200 (see FIG. 2) to the variables. These classification criteria are then placed into a statistical model produce a score indicating the probability that the transaction is fraudulent. The output of the predictive/scoring component 300 is a classification (fraud or no-fraud) and a confidence measure. The score of the transaction is the confidence measure. The score can be restricted to a real number between 0 and 1 with the boundary values corresponding to pure no-fraud and fraud, respectively. As a result, the model score can be treated as a probability of a transaction being fraudulent. If a transaction is represented by a data point X, where X is of n-dimensions (a field in the transaction representing a dimension), we have.

$$Score(X) = Pr(Fraud|X)$$

The learning component includes one or more risk tables which associate the risk of fraud when multiple variables occur in a transaction. As mentioned, the risk tables are multidimensional and depend on how many variables are grouped together. For example, a risk table will have four dimensions when four variables are grouped together in a model. The smallest grouping of variables is two variables. This also yields a two dimensional risk table.

Figure 5:
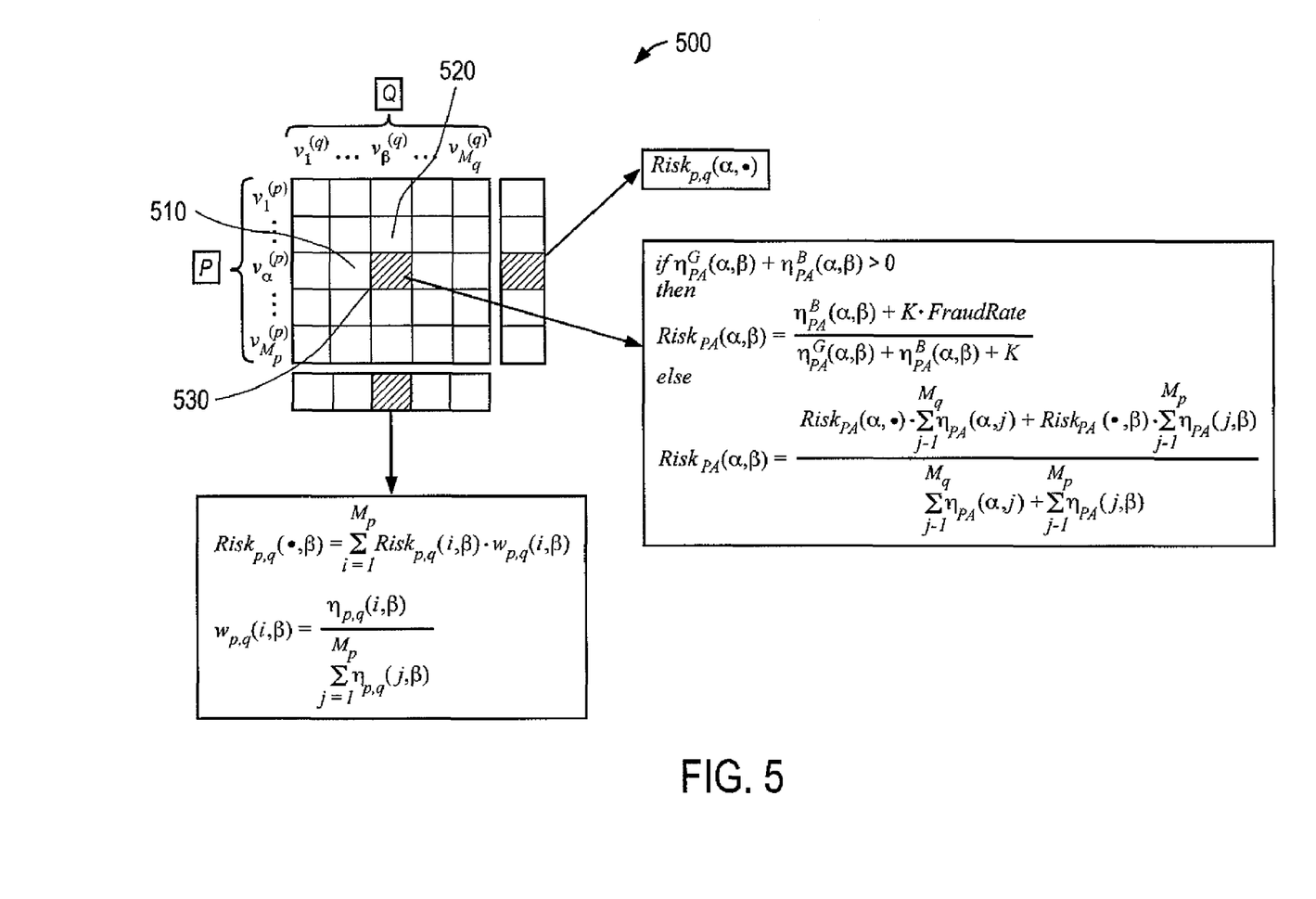
FIG. 5 is a view of a two-dimensional risk table in which an initial value of an empty cell is being approximated.

Turning briefly to FIG. 5, an example of a multi-dimensional risk table which is part of the learning component 200 of the fraud detection system 100, is shown. Even though FIG. 5 shows a two-dimensional risk table it should be noted that risk tables having many more dimensions can be learned or utilized in the fraud detection system 100. The two dimensional risk table shown is for illustrative purposes only. For the sake of illustration, this two dimensional risk table will be further detailed. Furthermore, it should be noted that the techniques discussed below can be extended to higher dimensional risk tables.

A multi-dimensional risk table can have a number of empty cells where there may be no information because an occurrence of the particular values of the variables may not occur in the historical raw data used in the learning phase. Generally, the more variables which are grouped together, the more dimensions of the risk table. The number of empty cells gets larger with increasing the number of dimensions simply because each and every occurrence of the number of dimensions will not occur given a limited amount of raw, historical data. In some instances, the empty cells can be filled with default values, however with added numbers of empty cells using such default values, the predictability associated with these risk tables may plummet.

Figure 4:
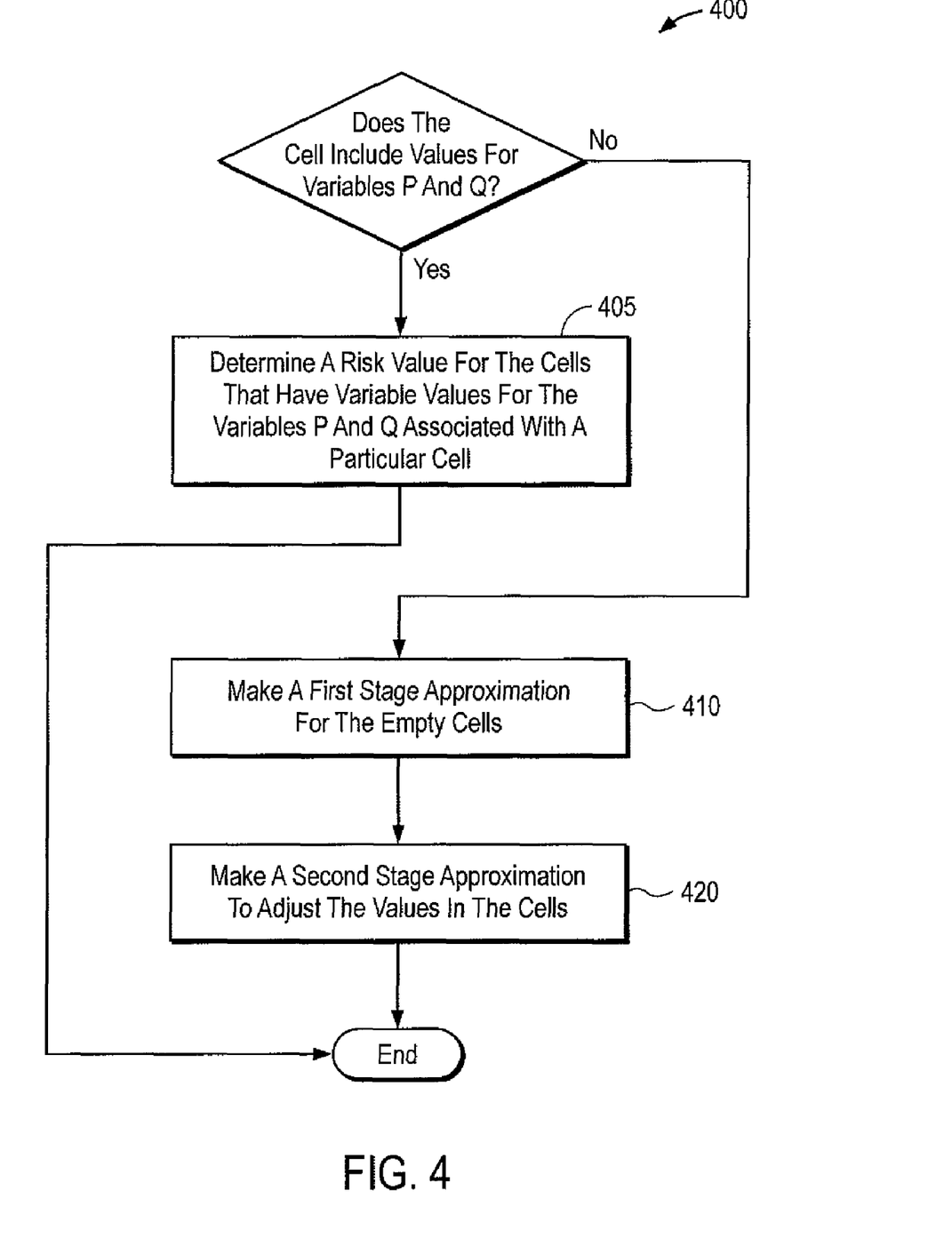
FIG. 4 is a flow chart of a method of approximating the value of an empty cell in a multidimensional risk table.

Rather than use default values, a two-stage process is used to more intelligently approximate the risk values in the empty cells of a multi-dimensional risk table. FIG. 4 is a flow chart of a method 400 that includes the two stages, according to an example embodiment. Initially, the method 400 includes determining a risk value for the cells that have variable values for two variables P and Q 405. The number of co-occurrences for each value pair $(\alpha, \beta)$ and how many of them are associated with a good transaction (class G: non-fraudulent) and with a bad transaction (class B: fraudulent), respectively, is counted. If the sum of the two is above a certain threshold, L, the risk for that cell is computed in a table by using the formula described for 1-D risk tables with some smoothing.

$$Risk(M_v) = \frac{\#B + K \cdot FraudRate}{\#B + \#G + K}$$

Where $M_v$ is a particular value variable M takes, #B is the number of fraudulent transactions in the training data having that value, #G is the number of non-fraudulent transaction in the training data having that value, K is a smoothing factor, and FraudRate is the global fraud rate across the entire training data.

Not all cells will have initial values. The method 400, therefore, also includes a first stage 410 and a second stage 420 which are used to approximate values for the empty cells. In the first stage 410 the value of an empty cell is approximated based on the calculated values of cells related to the empty cell. In the second stage 420, the initial approximation is adjusted to improve the value of the initial approximation. This two stage method 400 can also be used to improve the calculated risk values in the cells that are not empty.

FIG. 5 is a view of a two-dimensional type multi-dimensional risk table 500 in which an initial value of an empty cell 530 is being approximated, according to an example embodiment. As shown in FIG. 5, the two-dimensional risk table includes rows 510 (horizontal) and columns 520 (vertical). A two-dimensional risk table is built for two variables p and Q, each with $M_p$ and $M_q$ unique values respectively. Some of the cells have a risk value which is associated with a particular value of a variable P and a variable Q that has been calculated according to step 405, discussed above. With respect to cells that have no risk value, the method 400 includes a two stage approach to approximate values for the empty cells. The first stage 410 includes calculating an initial approximation of the empty cells by utilizing a weighted column 520 and row 510 average for each cell derived from calculated values of the non-empty cells in the column 520 and row 510 of the cell under approximation.

Thus, for each empty cell in the two dimensional matrix, an approximated risk value is calculated by utilizing a weighted average of the risks of the intersecting row 510 and column 520 for that cell. This is done for each empty cell in the matrix to fill up the entire two-dimensional matrix of risk values. Again, it should be noted that the same approach can be used to fill the empty cells of any multi-dimensional matrix of risk values and is not limited to a two dimensional matrix.

To improve the initial approximation, the second stage 420 of the method 400 includes using an incremental factorization-based method to improve the values of the initial approximation by calculating adjustments (or corrections) to the initial approximation values. The method 400 and specifically the second stage 420 produces two additional matrices, which when multiplied together, result in a matrix of the dimensions of the original risk table and its values represent the adjustments to the initial predictions for the risk values. These adjustments when added to the initial approximations yield the final improved risk value approximations. In one embodiment of the process, adjustments are computed on non-empty cells as well as those that were initially empty. Thus, in some embodiments, the previously empty cells and the previously non-empty cells can be improved using the second stage 420 of the method 400.

Figure 6:
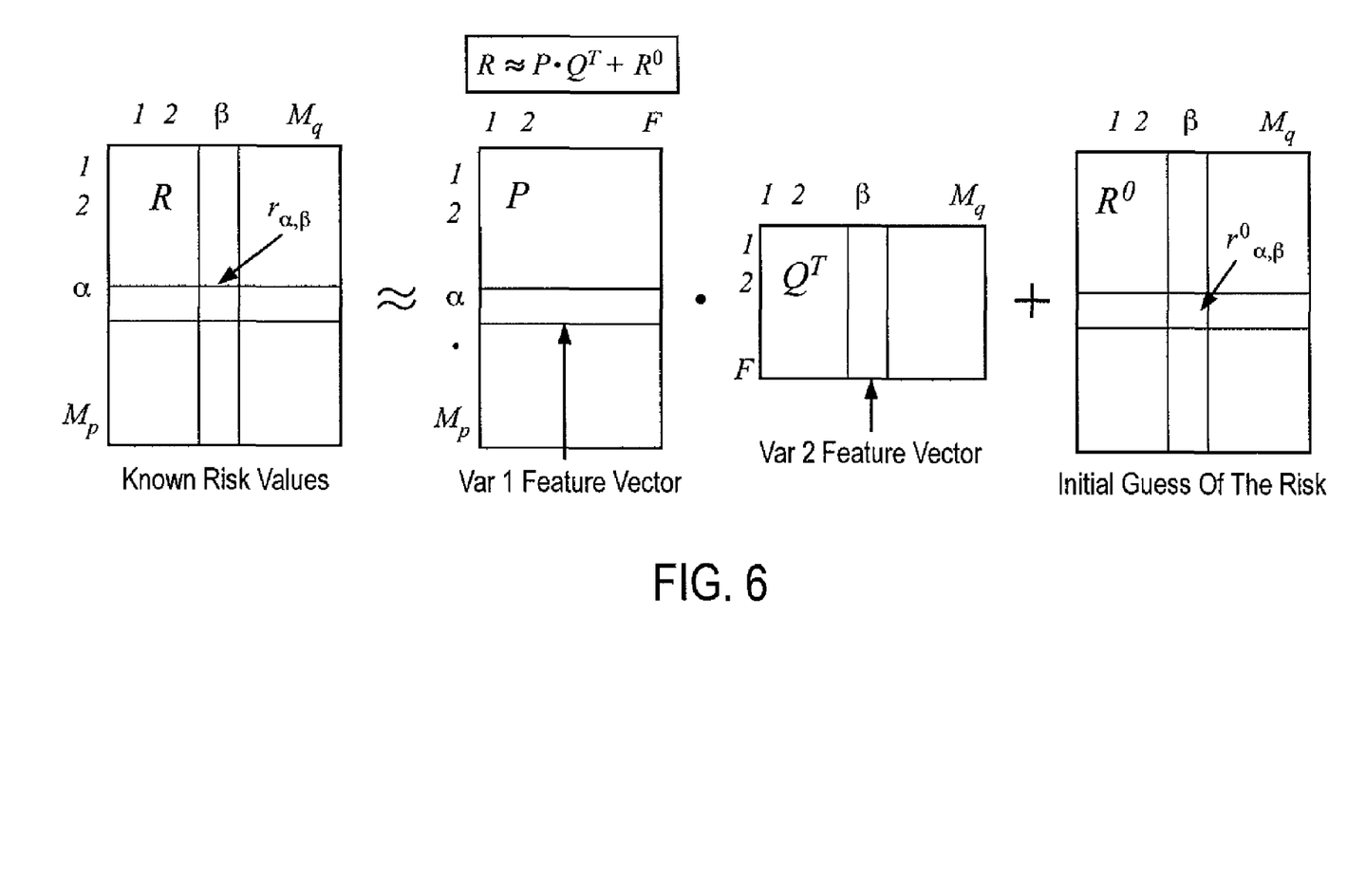
FIG. 6 illustrates the second stage of the method.

FIG. 6 illustrates the second stage 420 of the method 400, according to an example embodiment. The second stage works by using all the information in the non-empty cells and captures interactions among columns and rows in order to derive expectations for the empty cells. R is the initial risk table built using the approach discussed above with potentially many empty cells. Briefly, the approach discussed above includes determining a risk value for the cells that have variable values for the variables P and Q associated with a particular cell 405.

$R^0$ is the non-sparse risk table obtained after the first stage 410 of the method 400 is complete and the initial approximation of all empty cells is done. P and Q are matrices of so called feature vectors—each unique value of variables P and Q has a corresponding feature vector. Multiplying the feature vectors of a pair of values gives the adjustment to the initial approximation of the risk for that pair. In a way, the process can be viewed as a decomposition of the original sparse matrix R, from which decomposition we are able to infer the values in the empty cells of R. To compute the matrices P and Q, we use the following objective function:

$$\left| \min J(P,Q \mid R) = \sum_{\alpha,\beta} \varepsilon_{\alpha,\beta}^2, \text{ where } \varepsilon_{\alpha,\beta} = r_{\alpha,\beta} - \sum_{f=1}^{F} P_{\alpha,f} Q_{\beta,f}^T - r_{\alpha,\beta}^0 \right|$$

An incremental gradient descent method is used to minimize the prediction error on the known risk (the non-empty cells in R). The method starts with the initial guess for the originally empty cells and it gets the error for each variable pair (Var1 and Var2) risk value by subtracting it from the know risk value r. Then, it iteratively fits this error for each pair of risk values by building feature vectors for each Var1 value and for each Var2 value. The first feature vectors are built such that when multiplying the feature values for each Var1 and Var2 pair, a new approximation of the risk value for the variable pair that is better than the baseline one is obtained. Thus, the global mean squared error is reduced. Once feature vectors 1 for Var1 and Var2 are done, they are saved and the values do not change any more. When computing the new improved predictions while building feature vector 2, the values in feature vector I are used plus the baseline values. Thus, the error is incrementally refit by building more feature vectors. Just as in the conventional Singular Value Decomposition algorithm, the first feature vectors correspond to the first eigenvectors and capture most of the data variation. Therefore, there is a significant improvement in fitting the error provided by the first few feature vectors built, and less improvement as the number of feature vectors built increases. As this is done, the method also computes adjustments to the non-empty cells as well. Although, initially the non-empty cells were considered as the "ground truth", the adjustments can be used to test any variables created from the 2-D risk table on a validation data set. In this way, whether to use or not these adjustments on the non-empty cells can be chosen based by observing the performance of predicting fraud on a validation data set. Experiments have shown that many of the originally non-empty cells, typically the ones with a fewer number of exemplars, can benefit from these adjustments. Thus, the new algorithm not only approximates well values for the empty cells but also improves on some of the values in the non-empty cells.

The core of the approach is set forth below:

For feature f=1 to F

For epoch e=1 to E do (or until error on test data starts increasing)

$$U_{uf}^e += LRATE \times (\varepsilon_{um}^e \times M_{mf}^{e-1} - K \times U_{uf}^{e-1})$$

$$M_{uf}^e += LRATE \times (\varepsilon_{um}^e \times U_{uf}^{e-1} - K \times M_{mf}^{e-1})$$

Where:

$$\varepsilon_{um}^e = r_{um} - (U_{uf}^{e-1} \times M_{mf}^{e-1} + p_{um}^f)$$

$$p_{um}^f = p_{um}^0 + \sum_{g=1}^{f-1} U_{ug} \times M_{mg}$$

Here, U and M are the two variables in question with specific values u and m respectively. LRATE is a learning rate, K is a regularization factor which guards against overfitting, and $p^0$ is the initial guess of the risk coming from matrix $R^0$.

In one embodiment, this approach is used on a single set of variables that are considered predictive of whether a transaction is fraudulent or not. In another embodiment, more than one set of variables may be used to determine whether a transaction is fraudulent. In this embodiment, the approach is used on the multiple groupings of variables to determine whether the transaction is fraudulent.

A method of predicting the probability that a transaction is fraudulent includes reading historical transaction data, introducing a set of variables including multi-dimensional risk table variables, and determining a set of classification criteria. The method also included reading substantially real time transaction data, computing variables for substantially real time transaction data, wherein some of the variables are determined by obtaining values from the multi-dimensional risk tables computed, applying the classification criteria to the substantially real time transaction data, scoring the substantially real time transaction data, and classifying the transaction data as fraudulent based on whether the score is above a predefined threshold. Computing these risk table variable values includes: approximating an initial risk value for a substantially empty cell in a risk table based upon risk values in cells related to the substantially empty cell, determining an adjustment value for the approximated initial risk value, and applying the adjustment value to the initial risk value to yield a final approximate risk value for the previously substantially empty cell. Approximating an initial risk value for a substantially empty cell in a risk table includes, in one embodiment, computing a weighted sum of the risk values of the non-empty cells in the row of the substantially empty cell in the risk table. In another embodiment, approximating an initial risk value for a substantially empty cell in a risk table includes computing a weighted sum of the risk values of the non-empty cells in the column of the substantially empty cell in the risk table. In still a further embodiment, approximating an initial risk value for a substantially empty cell in a risk table includes computing a weighted sum of the risk values of the non-empty cells in the row of the substantially empty cell in the risk table, and computing a weighted sum of the risk values of the non-empty cells in the column of the substantially empty cell in the risk table, and determining the approximate initial risk value based on the weighted average of the risks of the row of risk values and the column of risk values that intersect at the substantially empty cell in the risk table. Determining the adjustment value includes determining a first matrix associated with a first variable associated with the risk table, and determining a second matrix associated with a second variable associated with the risk table. The first matrix and the second matrix are multiplied in one embodiment of the determination.

In some embodiment, method further includes identifying a first grouping of variables, determining a risk table for the first grouping of variables, identifying a second grouping of variables, and determining a risk table for the second grouping of variables. In one embodiment, at least one of the first grouping of variables and the second grouping of variables includes a pair of variables. In still another embodiment, the method includes building a two-dimensional risk table.

Figure 7:
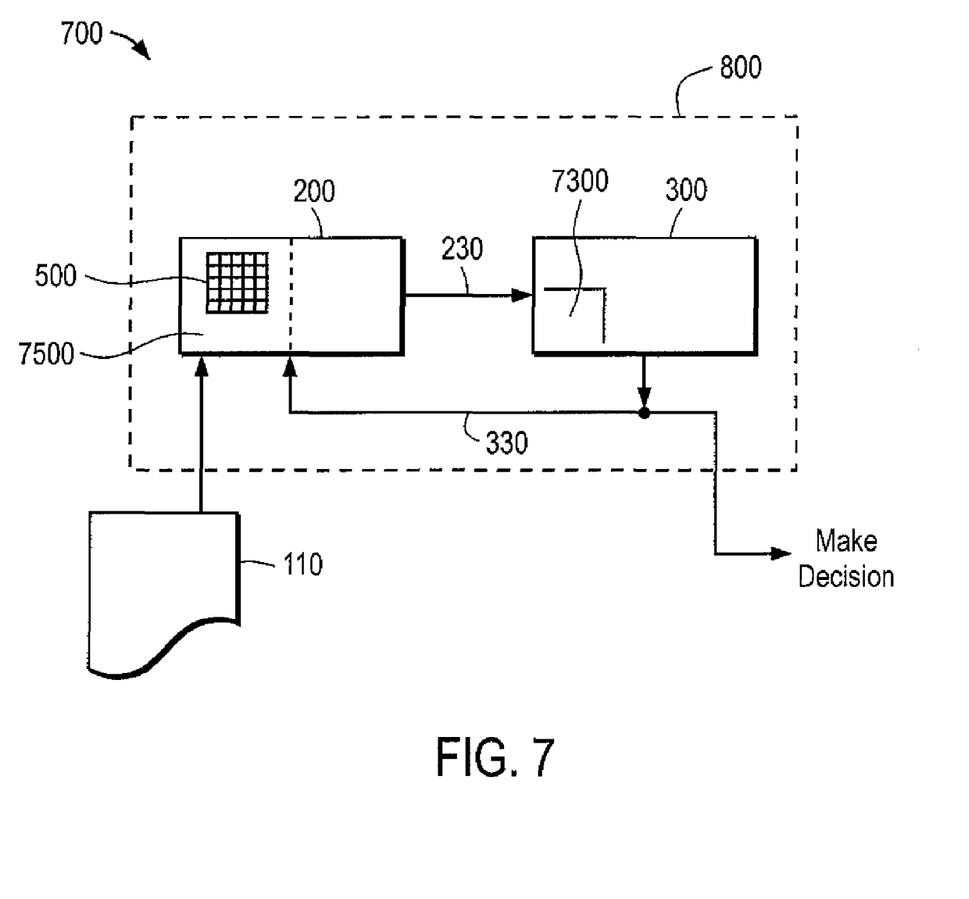
FIG. 7 is a computer system, according to an example embodiment.

FIG. 7 A system 700 for classifying a transaction as fraudulent includes a training component 200 which acts on historical data 110 further comprising a multi-dimensional risk table component 7500 that approximates an initial risk value for a substantially empty cell in a risk table 500 based upon risk values in cells related to the substantially empty cell, and a scoring component 300 that produces a score, based in part, on the risk tables 500 associated with groupings of variables having values determined by the training component. The scoring component 300 includes a statistical model 7300 that produces an output. The transaction is classified as fraudulent when the output is above a selected threshold value. The training component in some embodiments, further includes an adjustment value determination module for adjusting the approximated initial risk value and applying the adjustment value to the initial risk value to yield a final approximate risk value for a previously substantially empty cell. The multi-dimensional table 500 is at least a two-dimensional table that assesses the risk for different occurrences of two variables. In some embodiments, the training module employs a plurality of multi-dimensional risk tables.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Using multi-dimensional risk tables to derive variable of higher complexity boosts performance of fraud detection models. The potential sparseness issues of such risk tables is dealt with by computing an initial guess for the empty cells and then using an incremental factorization-based smoothing to compute corrections of the initial guess leads to good approximations for the originally empty cells. In addition to dealing with the sparseness in a seamless way, the subject matter described herein also improves on the originally computed values in the non-empty cells to boost model performance.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for assessing risk associated with a multi-dimensional risk table, the method being implemented by one or more data processors and comprising:

approximating, by at least one data processor, an initial risk value for a substantially empty cell in a risk table based upon risk values in cells related to the substantially empty cell, the approximating comprising:

computing, by at least one data processor, a weighted sum of the risk values of the non-empty cells in the row of the substantially empty cell in the risk table;

computing, by at least one data processor, a weighted sum of the risk values of the non-empty cells in the column of the substantially empty cell in the risk table; and determining, by at least one data processor, the approximate initial risk value based on the weighted average of the risks of the row of risk values and the column of risk values that intersect at the substantially empty cell in the risk table;

determining, by at least one data processor, an adjustment value for the approximated initial risk value; and applying, by at least one data processor, the adjustment value to the initial risk value to yield a final approximate risk value for the previously substantially empty cell, the final approximate risk value being used subsequently in a statistical model, the statistical model enabling a determination to be made whether a transaction data is to be classified as fraudulent.

2. The method of claim 1 wherein determining the adjustment value comprises:

determining, by at least one data processor, a first matrix associated with a first variable associated with the risk table; and determining, by at least one data processor, a second matrix associated with a second variable associated with the risk table.

3. The method of claim 2, wherein the first matrix and the second matrix are computed using the following objective function:

$$\left| \min J(P, Q \mid R) = \sum_{\alpha,\beta} \varepsilon_{\alpha,\beta}^2, \text{ where } \varepsilon_{\alpha,\beta} = r_{\alpha,\beta} - \sum_{f=1}^{F} P_{\alpha,f} Q_{\beta,f}^T - r_{\alpha,\beta}^0 \right|,$$

in which:
 P = the first matrix,
 Q = the second matrix,
 R = an initial risk table, and
 $R^0$ = a non-sparse risk table.

4. The method of claim 2 further comprising multiplying, by at least one data processor, the first matrix and the second matrix.

5. The method of claim 1 wherein the method further comprises:

identifying, by at least one data processor, a first grouping of variables;

determining, by at least one data processor, a risk table for the first grouping of variables;

identifying, by at least one data processor, a second grouping of variables; and determining, by at least one data processor, a risk table for the second grouping of variables.

6. The method of claim 5 wherein at least one of the first grouping of variables, and the second grouping of variables includes a pair of variables.

7. The method of claim 6 wherein the method includes building, by at least one data processor, a two-dimensional risk table.

8. A method for assessing risk associated with a multi-dimensional risk table, the method being implemented by one or more data processors and comprising:

approximating, by at least one data processor, an initial risk value for a substantially empty cell in a risk table based upon risk values in cells related to the substantially empty cell;

determining, by at least one data processor, an adjustment value for the approximated initial risk value by:

determining, by at least one data processor, a first matrix associated with a first variable associated with the risk table; and determining, by at least one data processor, a second matrix associated with a second variable associated with the risk table; and applying, by at least one data processor, the adjustment value to the initial risk value to yield a final approximate risk value for the previously substantially empty cell, the final approximate risk value being used subsequently in a statistical model, the statistical model enabling a determination to be made whether a transaction data is to be classified as fraudulent;

wherein the first matrix and the second matrix are computed using the following objective function:

$$\left| \min J(P, Q \mid R) = \sum_{\alpha,\beta} \varepsilon_{\alpha,\beta}^2, \text{ where } \varepsilon_{\alpha,\beta} = r_{\alpha,\beta} - \sum_{f=1}^{F} P_{\alpha,f} Q_{\beta,f}^T - r_{\alpha,\beta}^0 \right|,$$

in which:
 P = the first matrix,
 Q = the second matrix,
 R = an initial risk table, and
 $R^0$ = a non-sparse risk table.

* * * * *